United States Patent [19]
Cawlfield

[11] Patent Number: 6,088,630
[45] Date of Patent: Jul. 11, 2000

[54] AUTOMATIC CONTROL SYSTEM FOR UNIT OPERATION

[75] Inventor: David W. Cawlfield, Athens, Tenn.

[73] Assignee: Olin Corporation, Norwalk, Conn.

[21] Appl. No.: 09/188,109

[22] Filed: Nov. 9, 1998

Related U.S. Application Data
[60] Provisional application No. 60/066,204, Nov. 19, 1997.

[51] Int. Cl.[7] .............................. G05B 21/00; B01D 3/42; C25D 17/00
[52] U.S. Cl. .............................. 700/266; 700/270; 203/2; 203/DIG. 18; 202/160; 204/225; 205/337
[58] Field of Search .................................. 203/DIG. 18, 2; 202/160; 159/44; 700/28–31, 44, 45, 47–55, 266, 270, 273, 299; 204/225, 250; 205/337

[56] References Cited

U.S. PATENT DOCUMENTS

| | | | |
|---|---|---|---|
| 3,830,698 | 8/1974 | Kleiss | 203/2 |
| 5,244,544 | 9/1993 | Lang et al. | 203/2 |
| 5,402,333 | 3/1995 | Cardner | 700/31 |

OTHER PUBLICATIONS

Chapter 19 Distillation, *Continuous Process Control* by P.G. Friedmann and T.P. Stoltenberg, Editors, Instrument Society of America, 1996, pp. 401–423.

Chapter 8.12 Distillation: Basic Controls, by H.L. Hoffman, D.E. Lupfer, L.A. Kane and B.A. Jensen; *Process Control*, Instrument Engineer's Handbook, Third Edition, Bela G. Liptak–Editor–In–Chief; Chilton Book Company, Radnor, Pennsylvania, pp. 1169–1198 (1995).

Chapter 8.13 Distillation: Advanced Controlsdistillation-:Advanced Controls by H.L. Hoffman, D.E. Lupfer, L.A. Kane and B.A. Jensen;*Process Control*, Instrument Engineer's Handbook, Third Edition, Bela G. Liptak–Editor–In–Chief; Chilton Book Company, Radnor, Pennsylvania; pp. 1199–1232 (1995).

Chapter 8.14 Distillation: Relative Gain Calculations, by L.A. Kane and S. Ochiai; *Process Control*, Instrument Engineer's Handbook, Third Edition, Bela G. Liptak–Editor–In–Chief; Chilton Book Company, Radnor, Pennsylvania; pp. 1233–1245 (1995).

An Analysis of Steady–State Neural Networks Models for Distillation Control, by Himal P. Munsif and James Riggs; Department of Chemical Engineering, Texas Tech University (1996); pp. 1–28 with Figs. 1–10.

On Using Neural Networks Models for Distillation Control, by Himal P. Munsif and James B. Riggs; Department of Chemical Engineering, Texas Tech University (1996); p. 8, with Table 1 and Figs. 1–4.

Experimental Demonstration of Nonlinear Model–Based Control of a Nonideal Binary Distillation Column, by H.G. Pandit, R.R. Rhinehart and J.B. Riggs, Department of Chemical Engineering, Texas Tech. University, Lubbock, Texas; Proceeding of *American Control Conference 1992*; pp. 625–629.

Experimental Demonstration of Constrained Process Model–Based Control of a Non–Ideal Distillation Column, by H.G. Pandit and R.R. Rhinehart, Dept. of Chem. Engr. Texas Tech University, Lubbock, Texas; Proceedings of *American Control Conference 1992*; pp. 630–631.

Model–Based Control Streamlines Process, by James B. Riggs, Lubbock, Texas and Jackie Watts, Martin Beauford, Borger, Texas; *Control Strategies*, reprinted from Control, Jul. 1991; p. 5.

(List continued on next page.)

*Primary Examiner*—William Grant
*Assistant Examiner*—Steven R. Garland
*Attorney, Agent, or Firm*—William A. Simons; Wiggin & Dana

[57] ABSTRACT

Automatic control systems, and corresponding processes, for controlling either an anode adjuster in a chlor/alkali cell or at least one average middle temperature of a distillation column wherein the combination of feedback control from at least one real unit operation variable and an embedded real-time dynamic simulation of that variable are used.

7 Claims, 11 Drawing Sheets

OTHER PUBLICATIONS

Experimental Comparison of Advanced Control Techniques on a Lab–Scale Distillation Column, by Amit Gupta and R. Russell Rhinehart, Department of Chemical Engineering, Texas Tech University, Lubbock, Texas; Presented at *1995 American Control Conference Meeting*, pp. 1–15.

Neural Network Modeling for Distillation Control; by Soundar Ramchandran and R.R. Rhinehart, Department of Chemical Engineering, Texas Tech University, Lubbock, Texas; Presented as a poster paper at the *Sigma Xi Research and Creativity Day Symposium* (1993), p. 16.

Application of Neural Network Control to Distillation and an Experimental Comparison With Other Advanced Controllers; by P. Dutta and R. Russell Rhinehart, Department of Chemical Engineering, Texas Tech University, Lubbock, Texas; Draft for *Journal of Process Control* Feb., 1997; pages: cover page plus 1–71.

Tuning Sluggish Loops Using the ATV Procedure, by James B. Riggs, Department of Chemical Engineering, Texas Tech University, Lubbock, Texas; Division Newsletter, *Automatic Control Systems*, Spring, 1997; pp. 4–11;.

Experimental Comparison of Advanced Control Techniques on a Lab–Scale Distillation Column, by Amit Gupta and R. Russell Rhinehart, Dept. of Chem. Eng., Texas Tech University, Lubbock, Texas; *Proceedings of the American Control Conference*, Jun. 1996, pp. 3188–3191.

A Very Simple Structure for Neural Network Control of Distillation, by Sundar Ramchandran and R. Russell Rhinehart, Department of Chemical Engineering, Texas Tech University, Lubbock, Texas; *J. Proc. Cont.*, 1995, vol. 5, No. 2, pp.: 115–128.

Nonlinear Process Model Based Control of a Propylene Sidestream Draw Column, by James B. Riggs, Department of Chemical Engineering, Texas Tech University, Lubbock, Texas; Reprinted from *I& EC Research*, 1990, 92; pp. 2221–2226.

A Comparison of Advanced Distillation Control Techniques For a Propylene/Propane Splitter, by Vikram Gokhale, Scott Hurowitz and James B. Riggs, Department of Chemical Engineering, Texas Tech University, Lubbock, Texas; Reprinted from *I&EC Research*, 1995, 54; pp.: 4413–4419.

Avoid Problems During Distillation Column Startups, by Andrew W. Sloley; *Chemical Engineering Progress*, Jul., 1996, pp.: 30–39.

Dynamic Simulation and Nonlinear–Model–Based Product Quality Control of a Crude Tower, by Change–Bock Chung, Dept. of Fine Chemical Engineering, Chonnam National University, Korea and James B. Riggs, Dept. of Chemical Engineering, Texas Tech University, Lubbock, Texas; *AIChE Journal*, Jan., 1995, vol. 41, No. 1, pp.: 122–134.

AUTOMATIC CONTROL SYSTEM FOR UNIT OPERATION

CROSS-REFERENCE TO RELATED APPLICATION

This application claims the benefits of priority from U.S. Provisional Application Ser. No. 60/066,204, filed on Nov. 19, 1997. That provisional application is incorporated herein by reference in its entirety.

BACKGROUND OF THE INVENTION

1. Field of the Invention

The present invention relates to an automatic control system for a unit operation (e.g. a distillation tower or anode adjustment system of a chlor/alkali cell). In particular, the present invention relates to an automatic control system for a unit operation that involves measuring at least one process parameter in a real unit operation and both estimating the same parameter or parameters in a real time dynamic simulation of the unit operation.

2. Brief Description of Art

In 1993, it was has estimated that there are about 40,000 distillation columns in operation in the U.S. chemical processing industries (CPI). These columns are estimated to consume 3% of the total U.S. energy usage. Moreover, distillation columns comprise 95% of the separation processes for the CPI. Since distillation control directly affects product quality, production rates, and utility usage, distillation control has great economic importance.

In operation of continuous distillation, the chemical feed is added to a distillation column anywhere from the bottom to the top of the column, depending on the intended purpose. Heat added to a reboiler at the bottom of the column vaporizes a substantial portion of the feed, and cooling added to a condenser at the top of the column condenses at least a portion of the vapor from the top of the column. The section of the column above the feed point and below the condenser is referred to as the rectification section, and the section between the feed point and the reboiler is known as the stripping section. In the operation of a column the ratio of the flow of liquid to vapor and the relative volatility of the components determines how composition changes from stage to stage. Control over the performance of a distillation column is further accomplished by changing the heat added to the reboiler to change the vapor flow (boil up) and by controlling the amount of condensate that is recycled back to the top of the column (reflux) flow.

In general, changes in the reflux flow or the boil up rate individually alters the ratio of distillate to bottoms product flows and thus their composition. However, increasing both the boil up rate and the reflux flow so that the distillate and bottoms flows remain constant tends to increase the separation ability of the column. Logically, decreases of these flows have the opposite effect.

There are several difficult problems to be overcome in the control of a distillation column.

(a) Inability to tightly control the composition of both distillate and bottoms products simultaneously.

(b) Small changes in feed composition result in large relative changes in product purity.

(c) Column upsets require several hours to correct.

(d) High purity distillation control is difficult to accomplish without the use of on-line analyzers.

(e) Distillation requires much manual control during startup.

(f) Distillation consumes more energy than necessary and is less productive when reflux ratio is set at a fixed (too high) value, but this is a common approach to control.

These problems are described in the following general operating situations: first, there is a substantial quantity of liquid and vapor contained in each tray of the column during operation. Changes of feed composition, boil up, or reflux flow introduce disturbances in the column that require a substantial length of time before product compositions are affected, and substantially longer before they reach steady state following a disturbance. Once a distillation column is operating outside its specifications, it may take hours to bring it back to the desired operating conditions. One advantage of the present invention is that it provides a means to measure and respond to disturbances inside the distillation column before these disturbances affect composition of either distillate or bottoms product. The present invention improves the overall stability of column operation.

Another problem is that the steady state impact of any of these disturbances is highly non-linear. For example, if a small decrease in boil up rate increases the quantity of light component or components in the bottoms product from 1% to 2%, the same small increase in boil up rate may decrease them to only about ½%. This non-linearity causes conventional control systems to become unstable when they operate at conditions of lower purity than where they were tuned for optimum control. A second advantage of the present invention is that it provides a measure of the state of the column that is linear over the entire normal operating range. This enables startup of a column under automatic control. It also provides a linearizing method for composition control of high purity products.

Another difficulty often encountered is that the dynamic behavior of the column is highly complex. The initial response of distillate or bottoms composition to a change in an input variable is often in the opposite direction to that of the long-term steady state effect. Also, the time required between a change in input and approach to a new steady-state condition strongly depends on the amount and direction of the change. It is an advantage of the present invention that this complex dynamic behavior can be accurately predicted using a real-time dynamic simulation.

Disturbance rejection is a desirable property of the control of a distillation column. An efficient control algorithm should be able to prevent an unmeasured change in feed composition from affecting either distillate or bottoms composition significantly. The ratio of the relative change of product composition to the change in feed composition is the disturbance rejection ratio, (the smaller the better). Another advantage of the present invention is that it can decrease the disturbance rejection ratio below that achieved by other methods of the prior art applied to the same problem.

A particular problem for columns that operate with highly pure products at both distillate and bottoms is that a small change in feed composition may lead to a much larger relative change in composition of one or the other product. For this type of system, the disturbance rejection ratio of the system may be larger than 100% even while under sophisticated control strategies of the prior art. By employing the present invention, a disturbance rejection ratio less than 100% can be achieved.

Yet another difficulty with controlling high-purity distillation is that product compositions are not easy to measure. The boiling point of a high purity product changes very little with its purity, so an on-line chromatograph is often employed for this purpose. Such on-line analytical devices obtain adequate accuracy only when there is sufficient time required to separate the components inside the chromatograph. This time adds dead time to feed back control and makes it less able to reject disturbances. In addition, reliable performance of delicate analytical equipment is difficult to guarantee in a plant environment. Yet another advantage of this invention is that it allows precise control of the composition of products of a distillation even in the absence of on-line analyzers. The real-time dynamic simulation of this method provides an instantaneous "software analyzer," whose signals may be used for feedback control to achieve better disturbance rejection than for equivalent control strategies using a real analyzer.

Yet another difficulty of control is that each distillation column has a maximum capacity for liquid and vapor flows. When this limit is exceeded in any part of the column, liquid accumulates in the column. This behavior is known as flooding. Control systems must be designed to limit boil up and reflux rates in order to avoid flooding, but the maximum allowable vapor flow and liquid flows are also interdependent. As the boil up rate approaches flooding conditions, the vapor flow entrains some liquid from the lower stage. This entrapment decreases the apparently separation efficiency of the column. The control methods of this invention incorporate limits that will prevent flooding, and the dynamic simulation aspect of the present invention incorporate a method of continuously estimating the separation efficiency.

Yet another problem with distillation control is that another disturbance introduced into a distillation column is a change in the internal reflux rate that is caused by a change in reflux temperature coming from the condenser. Particularly for air cooled condensers, rain showers can cause rapid decreases in reflux temperature and thus significantly upset a distillation column. This invention addresses this method by incorporating reflux temperature into the dynamic simulation.

To deal with these difficulties, some distillation operations rely on feedback control strategies only to regulate feed flow rates, boil up rates, and reflux rates (or ratios), at predetermined settings that are updated only infrequently. While this is often termed automatic control, it is regarded as merely semiautomatic control in the context of this invention. When fixed column settings are periodically adjusted based on computerized steady state material balance calculations, using analysis of the feed, this method is sometimes described as computer process control, or control with computer simulation. However, the present invention considers these methods to be merely another type of semi-automatic control because they do not deal with the dynamic behavior of the process.

Semi-automatic control of a column that produces high purity products at both the distillate and bottoms is often effectively unstable, because very small disturbances in feed composition or flow rate will radically alter the purity of either bottoms or distillate. The present invention provides a method of stable, fully automatic control of controlling high purity distillation columns without any direct measurement of distillate or bottoms composition.

Semi-automatic control methods consume excess energy in order to incrementally increase the separation efficiency of a column above the minimum required. This margin allows fluctuations in product purity to be acceptable when the products are blended in storage or downstream operations. By employing the fully automatic control methods of this invention, a reduction in energy usage of 1% to 30% may be achieved by eliminating the need for this marginal excess. In addition, because the production rate of a column is limited by the design of the column to efficiently mix and separate vapor and liquids, a reduction in energy usage per unit of feed also allows a simultaneous increase in the production capacity of a column. Finally, greater consistency of product compositions by improved disturbance rejection can have a beneficial impact on the performance of downstream reactions and separations.

Prior art for distillation control also includes techniques of variable pairing and relative gain analysis to deal with the fact that the controls on a distillation column have affects on both overhead and bottoms compositions. For example, relative gain analysis attempts to use the steady state affects of small disturbances in boil-up rate and reflux rate on both overhead and bottoms composition to improve control response. These methods do not work as well as might be expected because the time-dependencies of each control are different for distillate than for bottoms compositions, and because they are non-linear. Detailed dynamic simulation also reveals that the apparent time constant for the response to a change in a manipulated variable is strongly dependent on the magnitude of the change. This invention effectively deals with non-linear behavior in the time domain.

To summarize, every existing approach to distillation control makes some false assumptions about distillation dynamics. Traditional PID control works best on systems where each manipulated variable has a predominant effect on only one property, and in a linear, stationary way. Because none of these assumptions are correct, PID control can stabilize column operation only in narrow operating regions, and often fails to solve any of the problems mentioned at the beginning of this paper. Furthermore, PID control optimally tuned for any one set of conditions may be unstable following a set point change.

Dynamic matrix control uses a stationary linear model of interaction between column variables, so while this approach often provides better control than PID, it is also limited to narrow operating range. Dynamic matrix models require time and expertise to build, and yet for distillation, these models will be invalidated any time the column operating conditions change significantly.

Non-linear model predictive control approaches allow for non-linear interaction between column variables, and may improve on dynamic matrix control in some cases, but are much more computationally complex, and the models are more problematic to create. Neural network based control is potentially easier to implement because the non-linear neural networks model can be fit to dynamic data from a column rather than requiring expert knowledge. However, the optimum structure of a neural network for distillation is unknown, and probably different for each application. Also, the neural network model is purely empirical and does not conform to mass or energy balances. Stable performance of a neural network control cannot be guaranteed, especially for operation outside of the training set conditions.

Sophisticated decoupling strategies for PID control can be implemented based on steady-state simulation updated with current column conditions. Decoupled controls may be properly referred to as simulation or non-linear model-based control, but because the simulation is based on steady-state models, the short term behavior of the process will not match that of the steady-state simulation, and control performance suffers may of the same problems as before.

BRIEF SUMMARY OF THE PRESENT INVENTION

One aspect of the present invention is a process to provide feedback composition control of a distillation column without the use of an on-line analyzer for either distillate or bottoms product stream. This aspect of the invention obtains an average from multiple temperature measurements of the middle section of the column, this middle section being that portion of the column where the composition changes the most. This temperature is referred to as the average middle temperature (AMT). The AMT is then used for feedback control of the column.

A second aspect of the present invention is directed to an automatic control system for a unit operation comprising:

(a) a real unit operation wherein at least one variable process parameter is measured in real-time intervals and an output signal corresponding to each measured process parameter is obtained;

(b) a real-time dynamic simulator of the unit operation, wherein said same process parameter or parameters are estimated in real-time intervals and an output signal corresponding to each estimated process parameter or parameters are obtained;

(c) a calculator for receiving the output signals from (a) and (b) and providing a calculated output signal that corresponds to the difference of those corresponding signals from outputs (a) and (b) for each process parameter;

(d) a mirroring controller capable of receiving the calculated output signal from the calculator and converting that calculated output signal into a change signal that is sent to the real-time dynamic simulator, whereby the estimated process parameter or parameters are updated and an updated estimated output signal is obtained in the real-time dynamic simulator; and (e) a feed-back control unit that capable of receiving a feed-back signal from the real-time dynamic simulator and converting that feed-back signal into one or more control output signals to both the real unit operation and the real-time dynamic simulator, each control output signal capable of causing an adjustment in the measured variable process parameter of that real unit operation and corresponding estimated process parameter in the real-time dynamic simulator.

A third aspect of the present invention is directed to the process for controlling at least one variable parameter of unit operation comprising the steps of:

(1) generating at least one measured output signal in real-time intervals from a real unit operation, said output signal or signals corresponding to a measured variable process parameter or parameters of the unit operation;

(2) generating at least one estimated output signal in real-time intervals from a real-time dynamic simulator; said estimated output signal or signals corresponding to an estimated variable process parameter or parameters of the real-time dynamic simulator;

(3) comparing each corresponding measured output signal and estimated output signal and calculating the difference between those signals;

(4) converting this calculated output signal into a change signal;

(5) generating an updated estimated output signal in the real-time dynamic simulator based on this change signal and sending this updated estimated output signal to step (3);

(6) generating a feed-back output signal in the real-time dynamic simulator based on the change signal; wherein this feed-back signal corresponding to the updated estimated variable parameter in said unit operation, (7) converting that feed-back signal into a control signal to the real unit operation and to real-time dynamic simulator, wherein the variable parameter of the unit operation and the estimated parameter in the real-time dynamic simulator are both adjusted.

Preferred aspects of this invention include the use of the above automatic control system and process of controlling with distillation towers or anode adjustment in chlor/alkali cells.

The above elements (b) to (e) and steps (2) to (6) can be performed in a computer using a control program. Any suitable computer may be used. A 133 MHz Intel processor was used with the Examples below. A preferred computer control program is the OMNX process control software available from Olin Corporation. This process control software contains a feedback control system that may be modified to carry out the above elements (b) to (e) and steps (2) to (6) as well as providing a output signal to the feedback controller as discussed below.

The preferred measuring elements or steps associated with real unit operation may be any suitable sensors for measuring the desired process parameter. These can include thermocouples or RTDs.

DETAILED DESCRIPTION OF THE PREFERRED EMBODIMENTS

Figure 1:
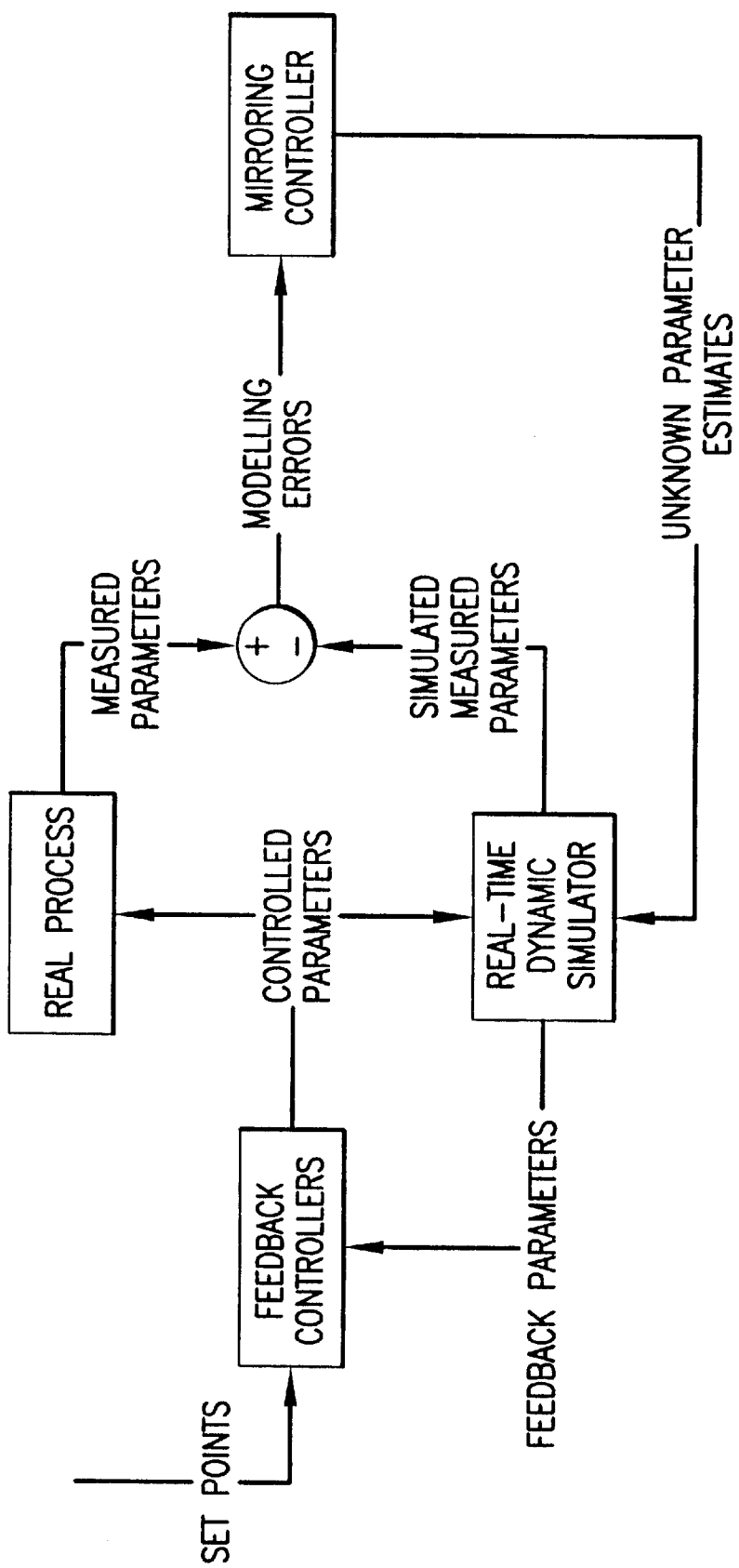
FIG. 1 is a flow chart of the generic control system of the present invention.
Figure 2:
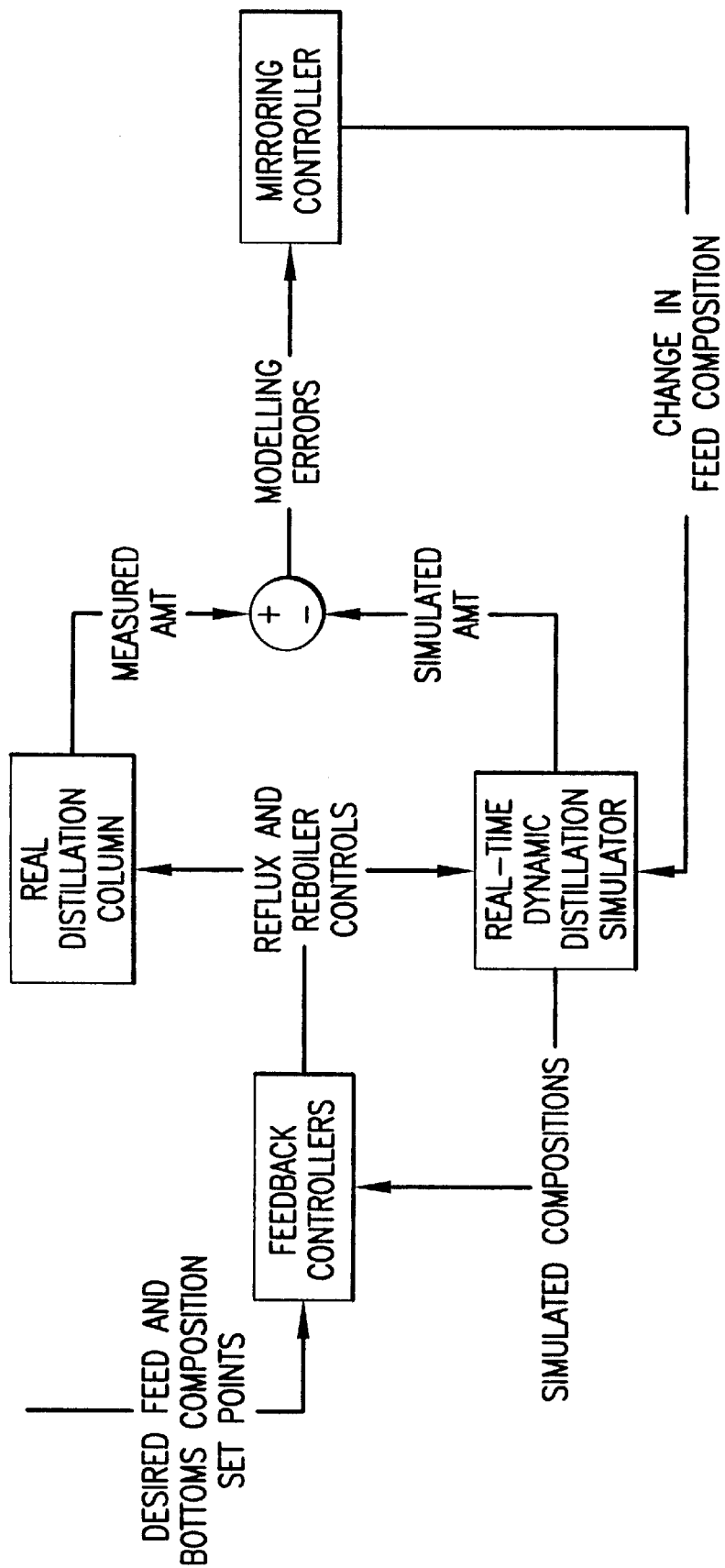
FIG. 2 is a flow chart of a preferred embodiment of the present invention wherein the Average Middle Temperature (AMT) of a distillation tower is used to control the performance of the distillation tower.
Figure 3:
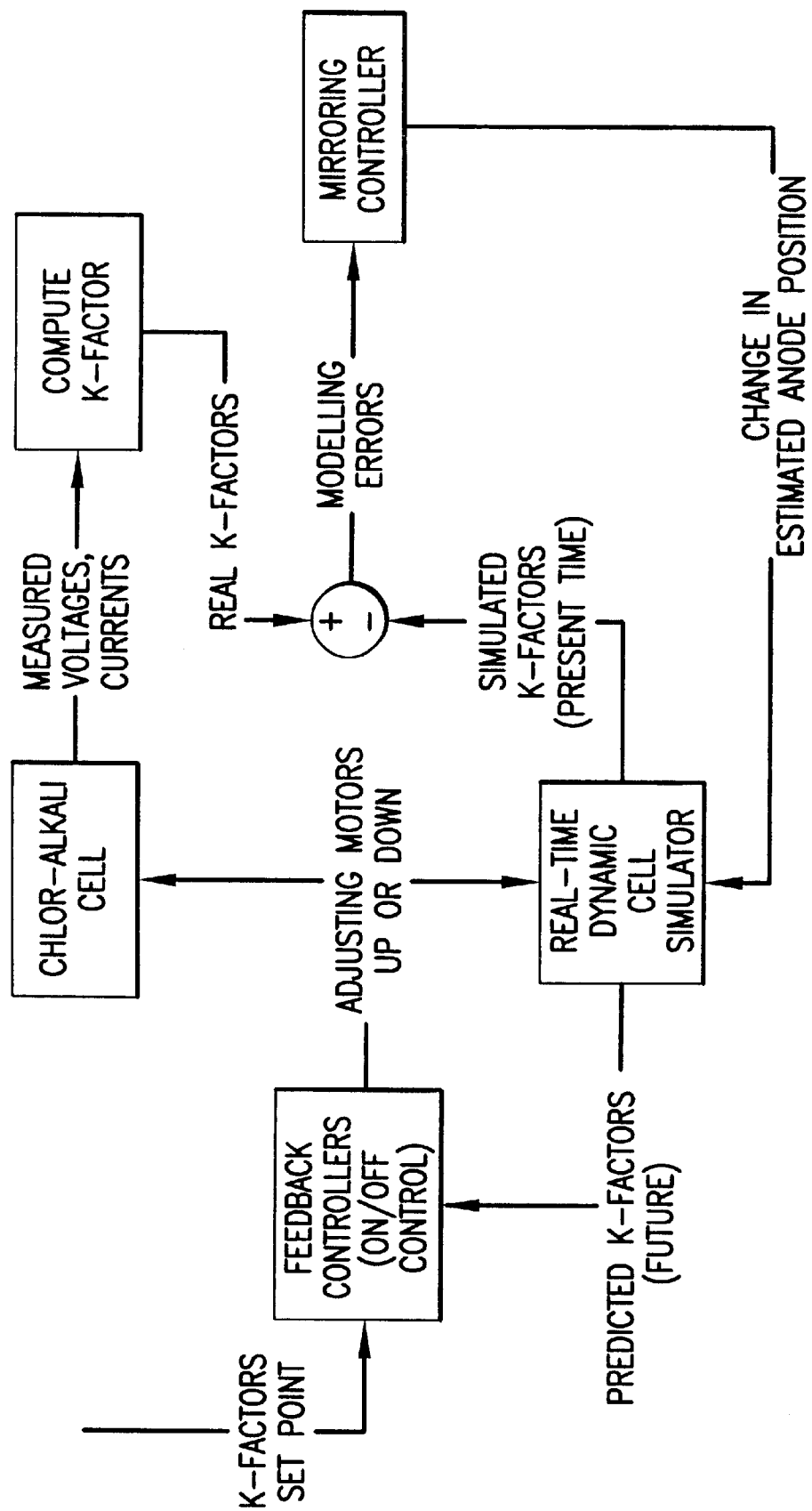
FIG. 3 is a flow chart of a preferred embodiment of the present invention wherein the K-factor is used to control the anode adjustment of a chlor/alkali cell.
Figure 4:
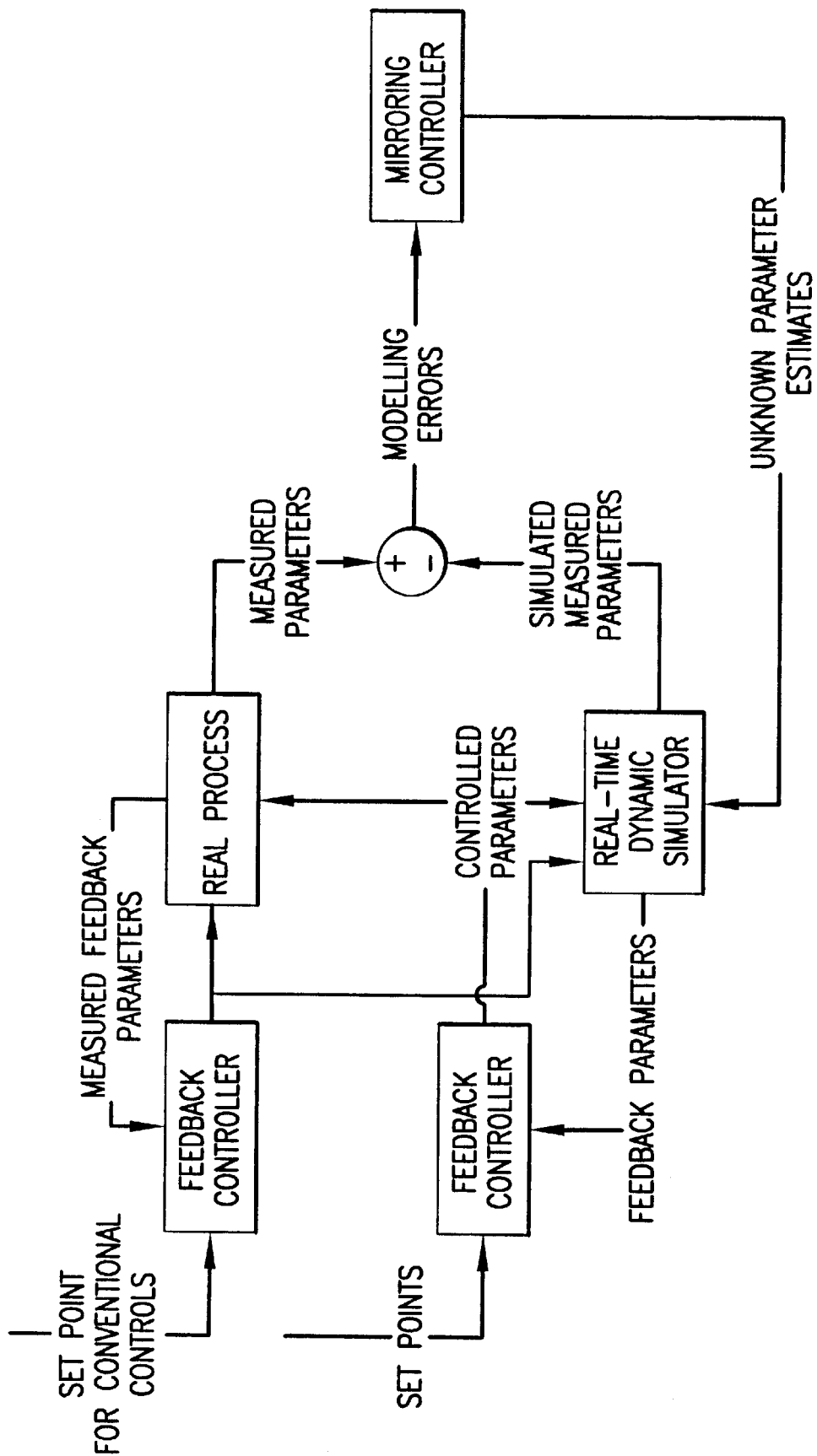
FIG. 4 is a flow chart of a preferred embodiment of the present invention wherein feedback parameters are additionally used to control a real unit operation.
Figure 5:
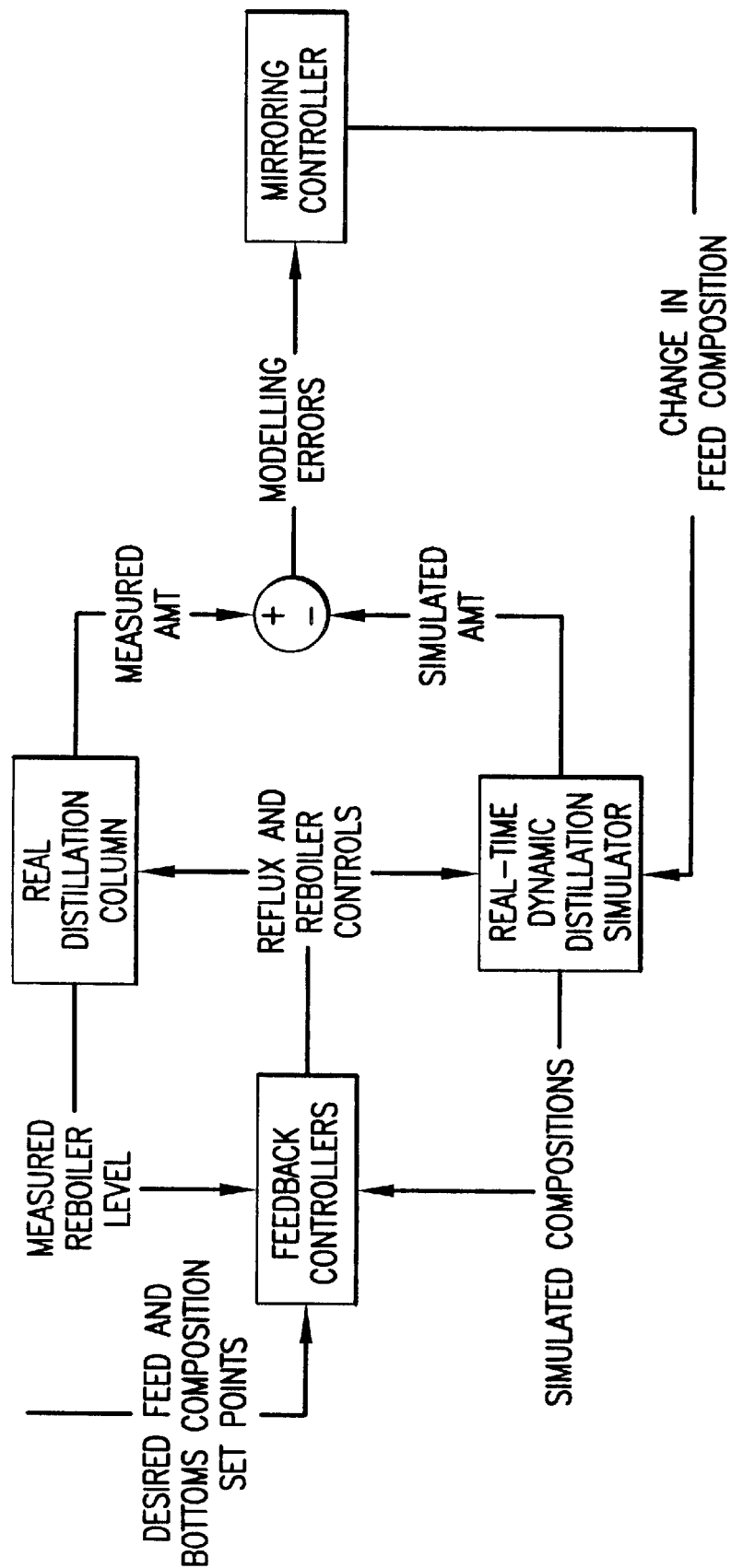
FIG. 5 is a flow chart of a preferred embodiment of the present invention wherein the AMT is used to control a real distillation lower and the control process additionally involves signals to a feedback controllers from both the real distillation column and the real-type dynamic distillation simulator.

The term "Average Middle Temperature" or "AMT" as used herein means the average of at least two temperatures taken at points on the column between the upper tray and the bottom tray of the column and wherein at least one of these temperature measurements is taken at or below a feed tray and another temperature measurement is taken at another tray at or above the same feed tray.

The term "real unit operation" refers to any chemical or physical operation where at least one variable process parameter can be both measured in real-time intervals and controlled.

The term "Dynamic Simulation" as used herein means a solution of a mathematical model that describes the time-dependent or temporal behavior of the parameters of a distillation column. This is in contrast to the "steady-state simulation" which is a solution of a mathematical model that describes the equilibrium behavior of the parameters of a distillation column).

The term "real-time" as used herein means that actual clock times and time intervals are synchronized with the time and time intervals used in making the calculations for a dynamic simulation.

The term "embedded" as used herein means that the real-time dynamic simulation communicates with a control system of a real distillation column wherein (1) the outputs of the control system (i.e., the signals that control various parameters of the distillation column) also go to the simulation and control the same parameters in the simulation and (2) one or more of the inputs of the control system are taken from the simulation (i.e., simulated parameters) instead of the measured parameters from the column. The inputs of the control system from simulation will replace the measured parameters in the control algorithm in the control system. Thus, the control signal back to the distillation column will reflect changes in the simulation.

The term "mirroring" as used herein is where the measurements from the real distillation column and the equivalent measurements from the simulated columns are compared at regular time intervals and are used to update estimates of variable parameters in the simulation (e.g., feed composition, or tray efficiency). These updated estimates are then used in subsequent calculations of the embedded real-time dynamic simulation. In one preferred embodiment of the present invention, the measured AMT of real distillation column is compared to the AMT measurement of simulation and the difference is used to update the subsequent calculations in the simulation. For example, if the feed composition of the real column changes, it will effect the AMT of the real column. When that new AMT measurement is communicated to the simulation by the mirroring function associated with the simulation, that different AMT (after being compared to the simulated AMT) causes changes in various output signals from the simulation. The mirroring function manipulates one or more unmeasured parameters in the simulation so that difference between the simulated AMT and real AMT approaches zero. The mirroring function thus uses the AMT difference to dynamically estimate the feed composition to the distillation column. It should be clear that the mirroring function can simultaneously and dynamically estimate many unmeasured parameters of distillation column. This mirroring function may be conducted with either a proportional integral (PI) controller or proportional-integral-derivative (PID) controller.

The AMT has a simpler dynamic response to changes in the feed composition, as well as to changes in the manipulated variables (boil up and reflux flow rates) than do the product compositions. It was discovered that the measured AMT responds to these changes more rapidly than the product composition of either distillate or bottoms. Therefore, control strategies based on AMT are able to respond to unmeasured disturbances in feed flow rate or feed composition and dissipate the effect of these disturbances on product composition.

This new embedded dynamic simulation approach to controlling distillation combines model-based control theory with real-time dynamic computer simulation. Dynamic simulation is a proven method of getting detailed information about the composition profile of a column and how it changes over time using first-principles models. By coupling the simulation with measurements from a real column, the simulation acts like a virtual analyzer, accurately estimating feed and product composition without requiring on-line analyzers. Having access to this detailed information then allows more precise model-based control over product composition while minimizing energy consumption. Optimum settings of reflux ratio and boil-up are determined moment by moment from the real-time simulation. These settings are then applied to the real column.

Real-time dynamic simulation provides an instantaneous estimate of compositions of the products and also inside the column. Novel feedback control methods use the simulated compositions as if they were real measurements. The controllers' outputs are used to adjust both the boil up and reflux flow rates in the real column as well as the simulation. Feedback control strategies using embedded simulation are only effective when the real-time simulation accurately estimates the behavior of the real column. The function that matches the behavior of the real column to the simulation is called mirroring. While most aspects of the real column are known by either measurement or experimentally with sufficient accuracy, some are unknown and variable. In particular, the composition of the feed may be unknown.

When the feed composition is not measured continuously we have discovered a novel way to continuously adjust the simulation to match the real column. This mirroring method relies on adjusting the feed composition in the simulation so that the AMT of the simulation matches the AMT of the real column. This adjustment may be performed using a feedback control algorithm, such as proportional-integral-derivative or other methods of the prior art. The input to the feedback control algorithm is the difference between the real and simulated AMT, and the set point is zero.

The separation efficiency of each tray is often not known. This efficiency is computed by several different methods, but the method based on vapor compositions known as Murphy vapor efficiency is often used. This efficiency is 100% for an ideal column, but typically ranges from 50% to 95% in real columns. The efficiency is affected by wear, fouling of column internals, and by liquid and vapor loading of the column, so it is not only unknown but also variable. This invention provides another mirroring method to deal with unknown separation efficiency by adjusting the separation efficiency of the simulation so that the temperature gradient of the simulation matches the temperature gradient of the real column. This gradient is determined by taking the difference of the sum of several temperature measurements closer to the bottom of the column from the sum of an equal number of temperature measurements made closer to the top of the column. The adjustment of the separation efficiency is also made using a feedback control algorithm, so that the simulation is continuously adjusted to match the behavior of the real column.

By continuously adjusting the simulation to match two characteristics of the temperature profile of the real column, the simulation accurately reflects the compositions of both distillate and bottoms products. When using the simulated product compositions for feedback control (by manipulating reflux flow and boil-up) the manipulated variables are changed in the real column and in the simulation simultaneously. When the design and tuning of this composition control are optimized to stabilize the compositions of both distillate and bottoms composition in the simulation, these composition are simultaneously stabilized in the real column as well.

Because the bottoms product flows and boil-up rate are ultimately linked by material balance of the reboiler, various alternatives are available to changing the boil-up rate that are similar, though not equivalent. For example, level control over the reboiler might be used to control heat input, while bottoms flow was used to affect composition. In this scheme, decreasing the bottoms flow will cause an increase in boil-up rate. However, increasing the feed rate will also eventually lead to an increased vapor flow for this control strategy, even though it would not for direct boil-up control. The control method described in this invention may be applied to alternate control strategies involving bottoms flow, and this alternative may be preferred in some cases.

There are also several alternatives to direct control of the reflux flow. For example, reflux can be collected in a receiver which overflows back into the column. In this case, increasing the flow of the distillate product causes a decrease in the reflux. However, this alternative is not quite equivalent to direct reflux flow control because an increase in the total condensate flow will also increase the reflux. Another alternative to reflux or distillate flow control is to operate a diversion valve that will send a fixed portion of the condensate flow to either distillate or reflux. This method is often achieved by use of a time proportional controller and is referred to as reflux ratio control. The control method described in this invention may be applied to alternate control strategies involving either reflux ratio or distillate flow, and these alternatives may be preferable in certain cases.

The design of simple distillation columns are often enhanced by the addition of multiple feed points, side draws of product from the middle of the column, or by adding side reboilers that increase the vapor flow above a certain level of the column. The simulation method of this invention applies particularly well to controlling these more complicated columns because the simulation can be used to dynamically predict internal column flows, and used to limit the addition rate of feed or heat so as to avoid flooding individual sections of the column.

Distillation columns are designed using trays of various designs or by the use of packed beds. The dynamic behavior of packed bed columns is somewhat different from trays because the liquid hold up of a packed column is more strongly dependent on the liquid flow. However, similar techniques of embedded simulation may be used, provided that the hydraulic behavior of the packed bed is well characterized.

Columns operated with variable feed rate and at variable pressure are also suitable for control using this invention. The pressure measured and regulated at the condenser is used in the simulation to compute the pressures throughout the column, taking into account the pressure drop between stages. Therefore, temperature changes inside the column due to the action of pressure controls will not interfere with the composition control achieved by this invention.

Where pressure control is achieved by changing the cooling water flow or temperature to the condenser, this invention can be extended to include a dynamic simulation of the condenser itself.

The steps involved in evaluating embedded real-time dynamic simulation are these.

1. Obtain liquid-vapor equilibrium data sufficient to build a mathematical VLE model for all components. This may already be available in a steady-state simulation.
2. Develop models of tray efficiency, liquid loading, and pressure drop as a function of liquid and vapor flow rates inside the column. This information is often available from the manufacturer.
3. Develop dynamic heat transfer models for the reboiler and condenser. These may be generic models adjusted to match actual column behavior.
4. Install the soft-DCS control system with the dynamic model so that it can control the column while running the simulation in parallel, but using existing control strategies.
5. Fine tune the model so that it faithfully matches the dynamic behavior of the real column, and add the synchronization algorithm.
6. Switch control from conventional to embedded simulation mode one-the-fly, and make performance tests.
7. Shut down and test automated startup while under embedded simulation control.
8. Audit operating data for a period of time to determine economic benefit.

Depending on the application, a generic distillation model can be extended to support packed columns; reactive distillation; side draws and side-reboilers; azeotropes and non-ideal mixtures multiple columns in series; and integration with reactors and other unit operations.

A real-time soft-DCS (distribution control system) is also a preferred prerequisite for embedded dynamic simulation. A soft-DCS is a control system that operates like a DCS, but uses PC-based software and a real-time operating system. The advantage of the soft-DCS is that it enables the use of powerful PC processors to perform both simulation and control. Real-time dynamic simulation must keep up with the real-world, while performing thousands of engineering computations each second. In embedded simulation, the values used in the simulation include all of the manipulated outputs from the controls themselves. These are obtained faster when they are available in the same CPU.

However, the principal economic benefits of this technology will include the following.

(a) reduced labor requirements, particularly during startup;

(b) improved quality and stability, particularly in the presence of changes in feed composition and rate. This will typically improve economic performance of downstream unit operations;

(c) a small reduction in unit energy consumption and a simultaneous small improvement in column capacity;

(d) Potentially valuable detailed understanding of the column's performance, and the ability to precisely identify problems with individual trays, prevent flooding and entrainment, and the like; and.

(e) on-line trends and information about changes in feed composition, even in the absence of analyzers. This can be used to optimize upstream operations.

The high-fidelity real-time dynamic simulation creates a wealth of useful diagnostic information that is not available in any other advanced control method. This information can help plant operators and engineers to make better decisions regarding maintenance and production planning.

The dynamic simulation can also be used off-line to answer what-if questions about the impact of design changes and alternate control strategies.

The following four Examples and one Comparison further illustrate the present invention. All parts and percentages are by weight and all temperatures are degrees Celsius unless explicitly stated otherwise.

EXAMPLE 1

Figure 6:
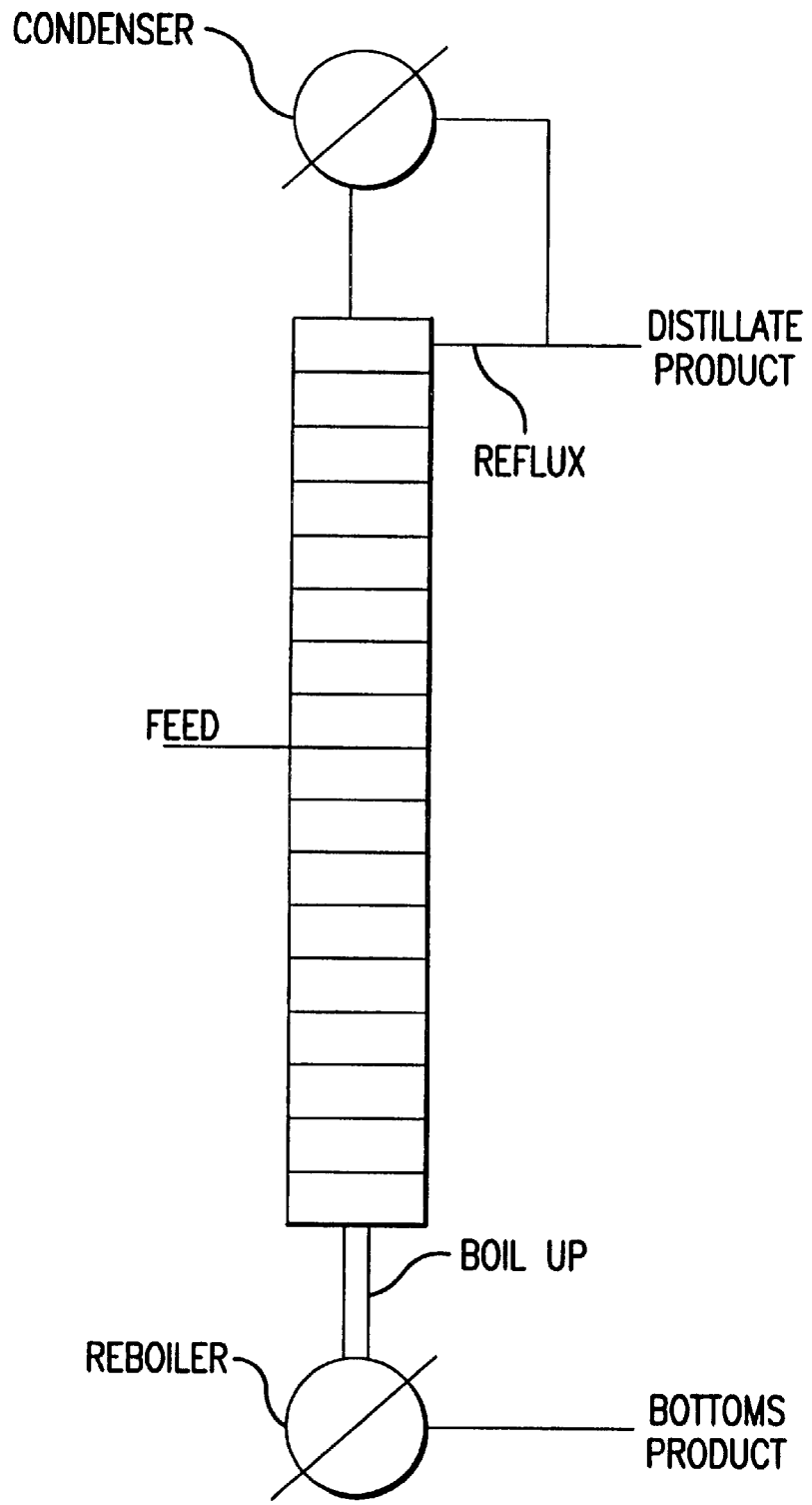
FIG. 6 is a schematic drawing representing a 50-tray distillation column that is designed to separate a mixture of 60% toluene and 40% xylene and wherein the feed is introduced on the $18^{th}$ tray.

Referring to FIG. 6, a 50 tray distillation column is designed to separate a mixture of 60% by mole fraction toluene and 40% xylene by mole fraction. The feed is introduced on the 18$^{th}$ tray from the bottom. The design of this column requires that both distillate and bottoms products have a purity greater than 99.9% by mole fraction. A composition profile is determined for the normal operation of the column by steady-state simulation as shown in the following table and chart. Accordingly, temperature probes are inserted into the column at trays 10,12,14,16,18,20,22 and 24. The average of all eight temperatures is then computed (by either digital or analog methods), and used for feedback control of steam flow to the reboiler. The feedback control algorithm is a proportional-integral-derivative type with upper and lower limits on the controller outputs. The limits on the controller outputs are set to 30% and 90% by weight of the maximum permissible vapor flow into the column so as to prevent flooding. The set point for the AMT controller is established by operating the column in semi-automatic mode until the desired separation conditions are achieved. Fully automatic operation is achieved by putting the AMT controller in automatic mode so that it responds to a difference between the measured AMT and the AMT set point by increasing boil up when the measured AMT is below set point, and decreasing boil up with the measured AMT is above set point. Controller tuning may be achieved by any of the methods of the prior art described for other modes of distillation control. Control of the reflux rate while using AMT to control boil up is by maintaining a constant ratio of distillate flow to reflux flow.

Figure 7:
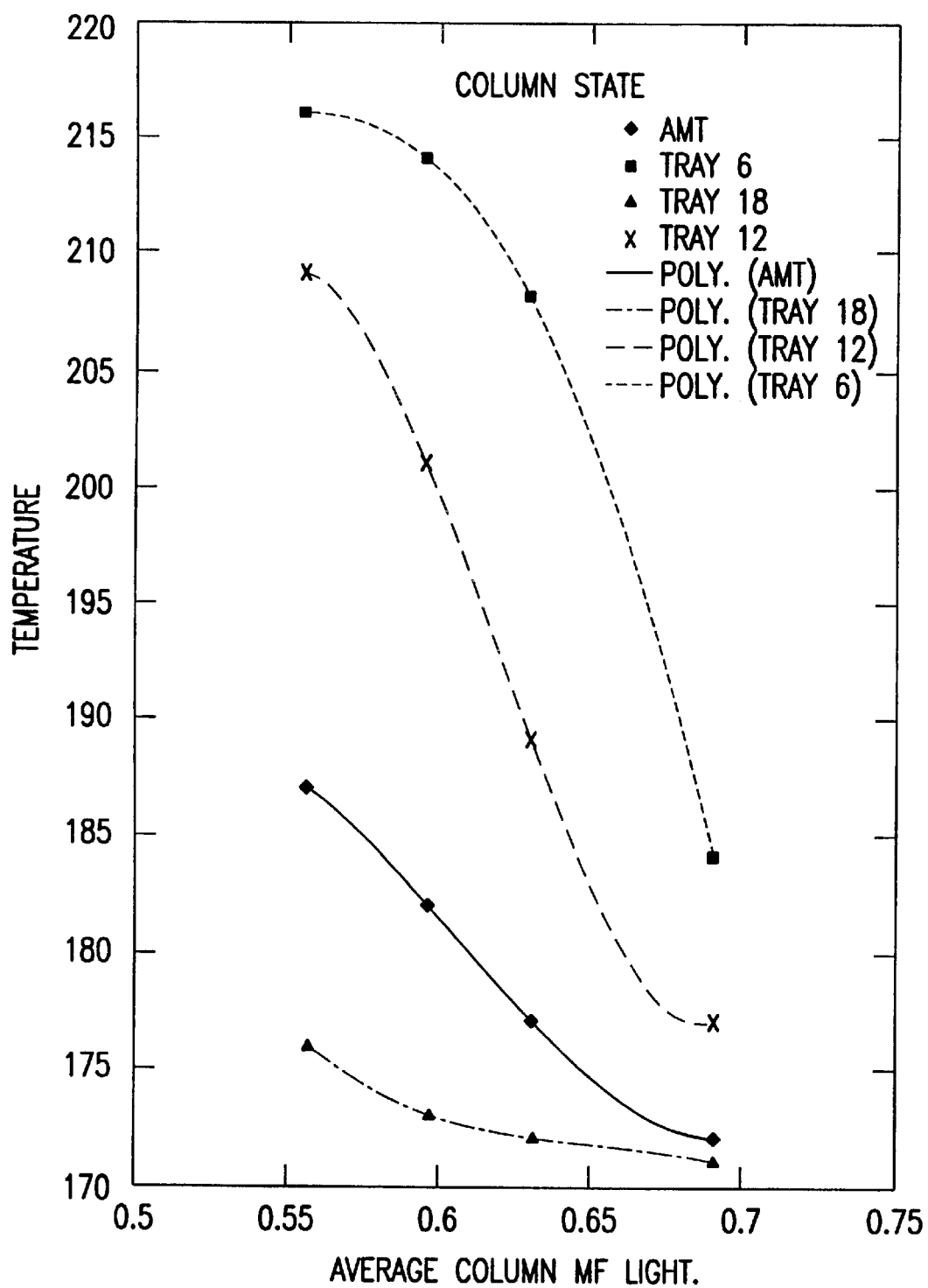
FIG. 7 is a graphic representation of Average Middle Temperature (AMT) and specific temperatures of trays 6, 12 and 18 over the average column liquid composition measured as mole fraction of toluene (light component) in Example 1.

The AMT of a distillation column provides a measure of the state of the column that has a nearly linear response to overall changes in internal composition of the column. FIG. 7 shows how the AMT is a more nearly linear function of average column composition than the temperature of any single tray. FIG. 7 was built using steady state simulation based of the toluene/xylene system described in Example 1. The different column profiles were produced by making approximately 1% by weight changes in the boil up rate and then adjusting the reflux ratio to keep the distillate composition constant. The column temperature and corresponding profiles are highly non-linear in distillation columns, even at steady state.

EXAMPLE 2 AND COMPARISON 1

Dynamic simulation requires computing the unsteady state material balance and vapor/liquid relationships for each tray in a distillation column. This section documents one example of how this can be accomplished mathematically.

Figure 8:
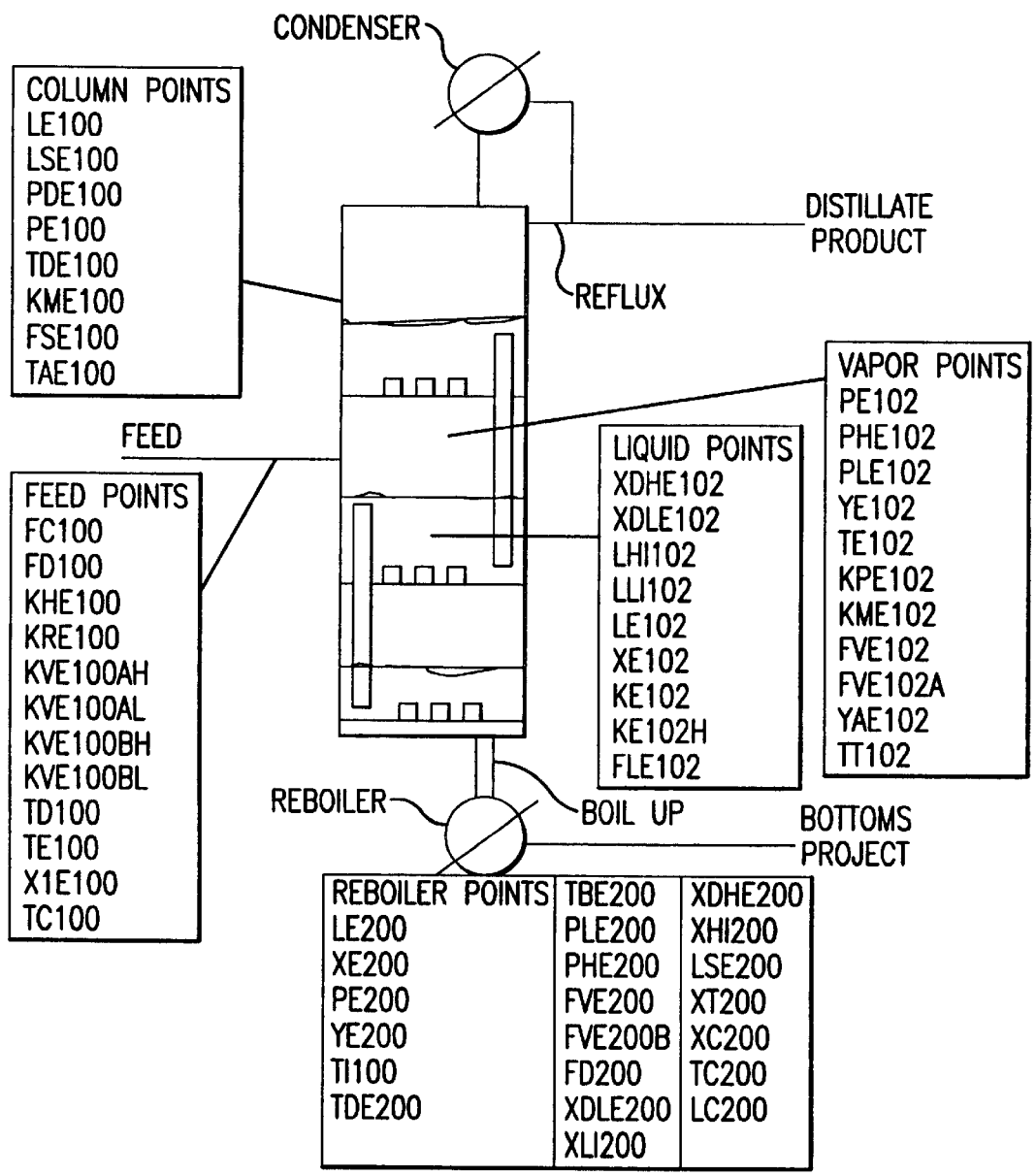
FIG. 8 is a representation of the name tags given to each parameter of a distillation column as employed in the dynamic simulation equations shown in the Tables in the Examples.

FIG. 8 and Table 1 below illustrate in general how simulation is performed. By duplicating the middle tray, this simulation may be extended to simulate any desired column with an arbitrary number of trays. Additional features, such as side draws and side reboilers may be added similarly to the computations of the first tray and the reboiler. Each computation of the simulation is labeled with a tag name as if it were an instrument.

The name tags in FIG. 8 and Table 1 are designed in the following manner. The numbers "101", "102", and "103" represent the first tray, second tray and third tray, respectively. The number "100" represents the column or the feed composition. The number "200" represents the reboiler and the number "201" represents the condensers. The combinations of letters in the name tags represent individual constants and variables for that particular area of the distillation column (e.g., first tray). The first letter of the combination represents the variable type. For example, the letter "T" represents temperature; the letter "L" represents level; the letter "X" represents liquid composition; the letter "Y" represents vapor composition; the letter "F" represents flow; the letter "P" represents pressure; and the letter "K" represents a constant.

The last letter of the name tag represents how the variable is calculated. For example, the letter "E" represents an algebraic expression; the letter "D" is a delay function; the letter "I" represents an integrator or totalizer"; the letter "C" represents a controller.

The middle letters, when present, provides other information about the variable. For example, the letter "R" represents ratio; the letter "H" represent enthalpy; and the letter "D" represents rate of change. The specific meaning of each name tag is given in the middle column of Table 1. The values or algebraic expressions or the like for each variable is given in the right-hand column of Table 1.

A test was made to compare the ability of a control method using embedded simulation to for feedback composition control to reject disturbances in the feed composition. Two real-time simulations were performed, one to represent the real column. The feed composition of the simulation was computed without direct reference to the feed composition of the "real" column, but rather by means of the feedback controls. The difference between the average middle temperature of the simulation and the average middle temperature of the "real" column, was used as an input to a PID controller whose output was the fraction of the light component in the feed. The compositions of the real column were then controlled by comparing the computed logarithm of composition of the simulation with setpoints. The outputs of these controllers were then applied to both real and simulated columns. Altering the percent reflux flow controlled distillate composition, while altering heat flow to the reboiler controlled bottoms composition. To test response to a feed composition change, the column was allowed to come to steady state while maintaining the feed composition at 63%, toluene and then decreasing the feed concentration abruptly to 60% mole fraction of toluene.

For comparison, this test was also performed using the same simulation, but with controls for distillate and bottoms composition that were delayed by five minutes (simulating the dead time of an on-line analyzer). After tuning the controls using Tyreos-Lyben methods, the response to a disturbance in feed rate was measured.

Figure 9:
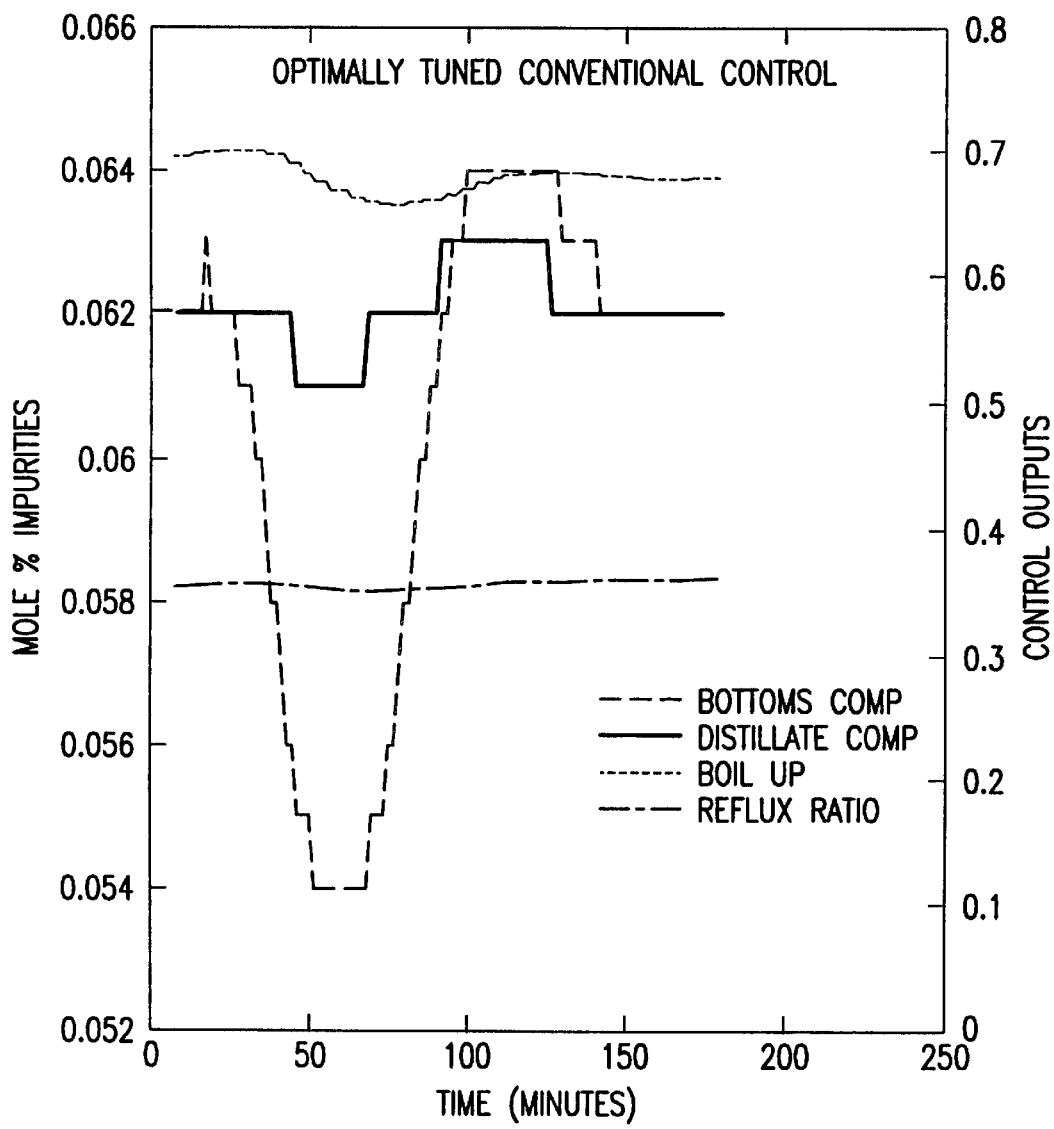
FIG. 9 shows an optimally turned response using conventional control techniques.

The result of this simulation using conventional control as shown in FIG. 9 is consistent with the results of prior art, and shows that the effects of a disturbance of a distillation column often last for several hours. Also, there is a substantial delay between the change in feed composition and the change in the distillate composition. As expected, the closed loop responses of conventional control takes the appearance of a dampened sine wave.

Figure 10:
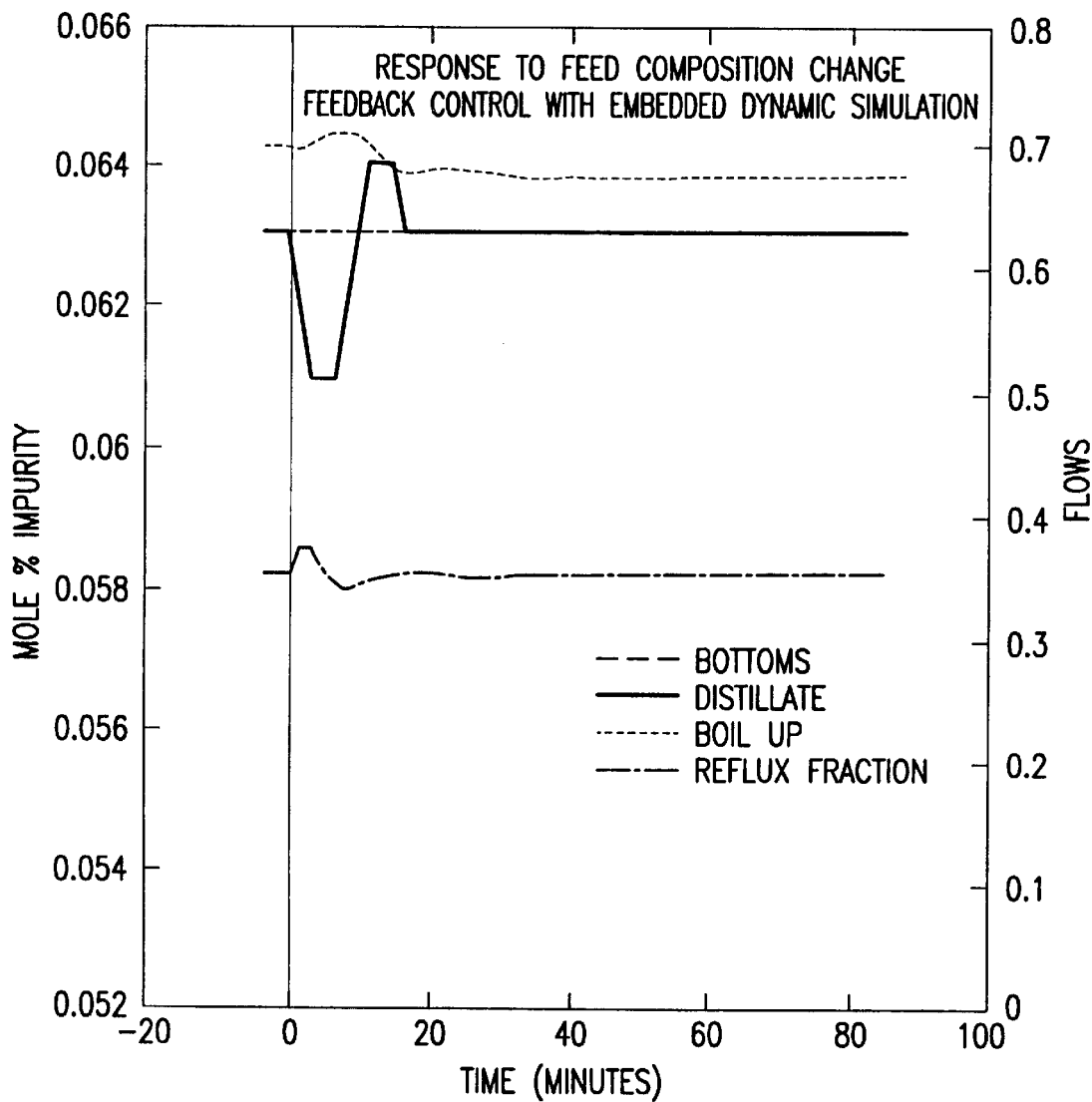
FIG. 10 shows the optimum response to feed compositions with the feedback cow system of the present invention.

FIG. 10, by contrast, is the result of the test of the novel control method using embedded dynamic simulation. Using this method, the bottoms composition was held nearly constant, while the distillate composition was disturbed less (note different Y-axis scales), and stabilized within twenty minutes.

This accurate control of distillate and bottoms composition simultaneously requires complex manipulation of both boil-up and reflux rates simultaneously. The changes in the controlled variables are not sinusoidal, and the initial changes are in the opposite direction from the steady state change.

TABLE 1

| Point ID | Description | Method |
|---|---|---|
| | Column Related Points | |
| LE100 | Tray holdup (minutes) | 50.0 |
| LSE100 | Weir height/normal level(ratio) | 0.25 |
| PDE100 | Maximum dynamic head loss (atm/tray at flooding) | 0.002 |
| PE100 | Static head loss (atm/tray) | 0.003 |
| FSE100 | Tray Feed Number | 18 |
| KME100 | Max Murphy Efficiency | TDC201.OUT |
| TDE100B | Simulated middle temperature gradient | (TE101+TE104+TE107−TE118−TE125−TE135)/3 |
| TDE100 | Real middle temperature gradient | (TT101+TT104+TT107−TT118−TT125−TT135)/3 |
| TAE100B | Average middle temperature | (TE106+TE109+TE112+TE115+TE118+TE121+TE124)/7 |
| TAE100 | Average middle temperature | (TE106+TE109+TE112+TE115+TE118+TE121+TE124)/7 |
| | Feed Related Points | |
| FC100 | Feed flow controller | PI;G=0.6, Ti=0.01 min |
| TC100 | Feed temperature controller | PI;G=0.2, Ti=0.01 min. |
| X1E100 | Mole fraction light in feed | Variable |
| FD100 | Feed Flow (% of flooding) | Delay of FC100.OUT, G=100, Tc=1.0 sec. |
| TE100 | Preheated Feed Temperature | 70+TC100.OUT* 10000/FD100 |
| TD100 | Dynamic Feed Temperature | Delay of TE100, G=1.0, Td=0.2 sec, Tc=1.0 sec, D=1.0 |
| XC100 | Feed Composition Solver | PI;G=20, Ti=0.2 min |
| KHE100 | Heat of Vaporization/Heat Capacity (Degrees F.) | 200 |
| KRE100 | Sqrt(liq density/vapor density) | Sqrt(833) |
| KVE100AL | Light Hv/R | 8020.3 (Toluene) |
| KVE100AH | Heavy Hv/R | 8591 (P-Xylene) |
| KVE100BL | Light vaporization Constant B | 107182 |
| KVE100BH | Heavy Vaporization Constant B | 93831 |
| | Liquid Points (All Middle Trays) | |
| XDHE102 | Forcing function for LHI102 | (1−XE100)*FD100*(FSE100==102)+FVE101*(1YAE101)+FLE103−XE103*FLE103 |
| XDLE102 | Forcing function for LLI102 | X1E100*(FSE100==102)+FVE101*YAE101+XE103*FLE103 |
| LHI102 | Heavy component on 102 (moles) | Integrator of function: y$^1$=XDHE102−y*KE102H |
| LLI102 | Light component on 102 (moles) | Integrator of function y$^1$=XDLE102−y*KE102L |
| LE102 | Liquid level on 102(% of full) | (LLI102+LHI102)*100/LE100 |
| XE102 | Mole fraction light in liquid 102 | 1−LHI102/(LLI102+LHI102+(LHI102==0)) |
| KE102 | Feedback Factor for LLI102 | (YAE102/(XE102+(XE102==0))*FVE102+FLE102)/(LE102+(LE102==0))*100/LE100 |
| KE102H | Feedback Factor for LHI102 | ((1−YAE102)/(1−XE102+(XE102==1))*FVE102+FLE102)/(LE102+(LE102==0))*100/LE100 |
| FLE102 | Liquid Flow from 102 to 101 | (LE102−100)*ILE102.LO*4 |
| | Vapor Points (All Middle Trays) | |
| PE102 | Absolute Pressure 102(atm) | PE102+LE103*PE100/100+FVE102*FVE102/10000*PDE100 100 |
| PHE102 | Partial Pressure Heavy 102 | KVE100BH*EXP(−KVE100AH/(TE102+460))*(1−XE102) |
| PLE102 | Partial Pressure Light 102 | KVE100BL*EXP(−KVE100AL/(TE102+460))*XE102 |
| YE102 | Mole fraction light 102 vapor | 1−PHE102/(PHE102+PLE102+(PHE102==0)) |
| TE102 | Temperature of tray 102 | 1(1/TE102+460)−LN(PE102/(PHE102+PLE102))/KVE100AH)−460*(TE102>−400) |
| KPE102 | Entrainment factor 102 | EXTN(−3*(1−FVE101*0.01)) |
| KME102 | Murphy vapor efficiency 102 | KME100/(1+KME100*KPE102/(1−KPE102)) |
| FVE102A | Vapor flow for 102 | FVE101+(FVE101>0)*0.5/KHE100*((TE103−TE102)*FLE103+(TD100−TE102)*FD100*(FSE100==102) |
| FVE102 | Corrected vapor flow 102 | FVE102A*(FVE102A>0) |
| YAE102 | Fraction light in vapor flowing from 102 to 103 | YE102*KME102+YAE101*(1−KME102) |
| | Light Points 101 (First tray above reboiler) | All liquid points other than those below are similar to those for tray 102 |
| XDHE101 | Forcing function for LHI101 | (1−X1E100)*FD100*(FSE100==101)+FVE200B*(1−YE200)+FLE102−XE102*FLE102 |
| XDLE101 | Forcing function for LLI101 | X1E100*FD100*(FSE100==101)+FVE200B*YE200+XE102*FLE202 |
| | Vapor Points 101 (First tray above reboiler) | All vapor points other than those below are similar to those for tray 102 |
| PE102 | Absolute Pressure 101 (atm) | PE101+LE102*PE100/100+FVE101*FVE101/10000*PDE100 |

TABLE 1-continued

| Point ID | Description | Method |
|---|---|---|
| FVE102A | Vapor flow for 101 | FVE200B+(FVE200B>0)*0.5/KHE100*((TE102-TE101)*FLE102+(TD100-TE102)*FD100*(FSE100==101) |
| | Liquid Points 103 (Last tray before condenser) | |
| XDHE103 | Forcing function for LHI103 | (1-X1E100)*FD100*(FSE100==103)+FVE102*(1-YE102)+FRD201-YE103*FRD201 |
| XDLE103 | Forcing function for LLI103 | X1E100*FD100*(FSE100==+FVE102*YE102+YE103*FRD201 |
| | Vapor Points 103 (Last tray before condenser) | |
| PE103 | Absolute Pressure 103(atm) | PE201 |
| FVE103 | Vapor flow for 103 | FVE102 |
| | Reboiler Related Points | |
| LE200 | Reboiler level | (XLI200+XHI200)/LSE200 |
| XE200 | MF light in bottoms product | XLI200/(XLI200+XHI200+(XLI200==0) |
| PE200 | Reboiler pressure | PE101+PE100*LE101/100+FVE200*FVE200/10000*PDE100 |
| YE200 | Bottoms vapor Composition | PLE200/PLE200+PHE200) |
| FI200 | Bottoms Temperature | Integrator of function $y^1$=TDE200 |
| TDE200 | Reboiler Dynamic heat balance | (FD200*100-FVE200B)*KHE100/LE200 |
| LSE200 | Reboiler holdup (minutes) | 5 |
| TDE200 | Bottoms boiling point | 1/(1/(TI200+460)-In(PE200/PHE200+PLE200))/KVE100AH-460*(TBE200>-200) |
| PLE200 | Reboiler partial pressure light | KVE100BL*EXP(-KVE100AL/(TI200+460))*XE200 |
| PHE200 | Reboiler partial pressure heavy | KVE100BH*exp(-KVE100AH/(TI200+460))*(1-XE200) |
| FVE200 | Uncorrected reboiler vapor flow | FD200+(TI200-TBE200)*LE200/KHE100 |
| FVE200B | Corrected reboiler vapor flow | FVE200*(FVE200>0)*(LE200>0) |
| FD200 | Steam heat to reboiler | Delay of TC200.OUT:Gain=100,Td=0.1 sec, Tc=0.2 sec |
| XDLE200 | Reboiler dynamic mass balance light component | FLE101*XE101-FVE200B*YE200-LC200.OUT*100XE200 |
| XDHE200 | Reboiler dynamic mass balance heavy component | FLE101*(1-XE101)-FV200B*(1-YE200)-LC200.OUT*100*(1-XE200) |
| XLI200 | Light in reboiler | Integrator of $y^1$=XDLE200 |
| XHI200 | Heavy in reboiler | Integrator of $y^1$=XDHE200 |
| XT200 | Bottoms analyzer | Delay of XE200:Gain=100,Td=20 sec, Tc=2 sec |
| XC200 | Bottoms composition control | PID:G=200, Ti=0.65 min, input=XLE200 |
| TC200 | Bottoms heat control | PID;G=8, Ti=0.05 min, cascade=XC200.OUT, INPUT=TAE100 |
| LC200 | Bottoms level control | Batch:G=-2.5, input=LE200 |
| XLE200 | Log of bottoms composition | -Log(XE101) |
| | Condenser Related Points | |
| TC201 | Distillate reflux control | PID:G=250, Ti=0.9 min, input=XLE201 |
| XT201 | Distillate analyzer | Delay of XE201, G=1.0, Td=20 sec. Tc=2 sec |
| XLE201 | Distillate log mole fraction heavy | 2-LOG(XE201) |
| XE201 | Distillate mole % heavy | (1-YE103)*100 |
| FRD201 | Reflux flow | TC201.OUT*FVE103 |
| PE201 | Condenser absolute pressure(atm) | 0.12 |
| PLE201 | Distillate partial pressure light | KVE100BL*EXP(-KVE100AL/(TI201+460))*YE103 |
| PHE201 | Distillate partial pressure heavy | KVE100BH*EXP(-KVE100AH/(TI201+460))*(1-YE103) |
| TE201 | Distillate boiling pot | 1/(1TE201+460)-In(PE201/PHE201+PLE201+(PLE201==0))/KVE100AH)-460*(TE201>-400) |
| TDC201 | Column gradient mirroring control | PID:G=2.0, Ti=0.5 min, input=TDE100C |

EXAMPLE 3

Automatic anode adjustment is an example of applying the principles of this invention for the purpose of process control other than distillation. In the electrolytic manufacture of chlorine and caustic soda by the mercury cell process, an electric current is passed through a brine solution in a cell containing a horizontal flowing mercury cathode, and an anode structure suspended in the brine above the mercury surface. To achieve optimum use of energy, the distance between anode and cathode must be maintained in the presence of disturbances that may change this distance (such as disturbances in mercury flow or temperature changes in the cell, causing expansion or contraction of metal parts.). In practice, the anode/cathode gap is not measured directly, but indirectly through the measurement of voltage and current through the cell. The gap can be estimated while current is passed through the cell by calculating the K-factor, otherwise called the voltage coefficient for the cell by the formula K=(E-3.1)/I where E is the cell voltage in volts, and I is the current density in kiloamperes per square meter of anode surface. In commercial practice, the computed K ranges from 0.040 to 0.300 volts per kA per square meter. K represents the resistance of the brine which is proportional to the distance between anode and cathode, while the constant 3.1 in the equation represents the minimum potential at which electrolysis will take place. Depending on a variety of factors, such as cell temperature, current density, and the like, an optimum K-factor can be found at which the anode-cathode gap is optimum for minimum power consumption or some alternative economic criterion.

Conventional feedback control of anode position could be performed by turning an adjustment drive on to raise an anode whenever the computed K factor was too low, and turning the drive on to lower the anode whenever the K factor was too high. The problem with this approach is that the measurements of current and voltage have a significant component of electrical and measurement noise. Unwanted movement of the anode would result from simple feedback. One alternative known in the prior art, involves using analog or digital filtering methods to reduce the measurement error and hence the random fluctuations in the repeated computation of the K-factor. The problem with using filtered signals is that the filtering algorithm introduces some delay in the response to a change in the anode position. If the filtered signals were used in a simple on/off feedback control, the adjusting motor would drive the anode too far in a given direction before the filtered K-factor would change. In this case. control would be unstable.

Applying the method of the current invention to this problem, a real-time dynamic simulator of the cell performs calculations of K-factor based on an assumed anode position. Drive control signals sent to the cell are also sent to the simulator and in the simulator, the anode position is updated by integrating the up or down drive signals over time. The simulation generates a noise-free K-factor based on the simulated anode position, and this allows simple on-off feedback control based on this signal to be both stable and free of undesired adjustments. For this method to be truly effective, the real-time simulation of anode position must also match the anode position in the real cell. Were it not for some means of correcting it, integration errors or variations in motor performance would lead to gradually increasing miss match between the simulated anode position and the real one. The solution to this problem is to also compute a K-factor from the real (noisy) cell measurements and take the difference between this "real" K-factors and the ones from the simulation, and send this difference to a mirroring controller. The transfer function of the mirroring controller produces a signal that is a rate of change of simulated anode position, and this signal is integrated along with the adjusting motor position to correct the simulated anode position. The transfer function of the mirroring controller is a proportional + integral function with gains that are adjusted to provide slow continuous correction of simulator in order so that the modeling error when averaged over time is zero.

This method has been tested to adjust an actual operating chlor/alkali cell having 12 anode assemblies, each of which was fitted with separate adjustment motors that can turn at constant speed up or down. The motor speed and gear ratio achieved on the anode adjustment drive achieved a speed of 5 millimeters per second either up or down. Current is fed to each anode assembly via two busses, each of which had a current measuring sensor and voltage between each anode assembly and the cell bottom was also measured for each buss. The signals from current sensors and drive controls for each motor were connected to a single computer-controller that adjusts all 12 anodes simultaneously. The on/off control of anode position, the real-time dynamic simulation, the computation of "real" K-factors, and the mirroring controller functions are all performed by the computer-controller, operating on a 10 millisecond scan cycle. Since there are 12 adjustable anode assemblies, there are 12 identical real-time dynamic simulations performed and 12 mirroring controllers. To make optimum use of the two current and voltage measurements for each anode assembly, a "real" K-factor was computed for each buss, using the corresponding voltage and current measurements. The two K-factors were compared, and the lowest one selected for use in computing modeling error. On each cycle of the controller, updated current and voltage measurements are taken, updated K-factors computed, a new simulated anode position calculated, and new predicted and simulated K-factors computed.

The simulated anode position was computed by integrating signals to the anode drives. If the anode drive was raising, the simulated anode position increases by 0.5 millimeters per second. If the anode drive was lowing, the simulated anode position decreases by 0.5 millimeters per second, corresponding to the measured performance of the actual drives. A predicted K-factor was obtained by multiplying the predicted anode position by 0.030, or optionally by a constant that included temperature compensation for conductivity of the brine. To obtain a simulated K-factor, the predicted K-factor was delayed using an exponentially weighted moving average filter having the same time constant as the electronics used to obtain actual current and voltage measurements.

Updated modeling errors are used to update the change in estimated anode position to be used on the following update cycle. The newly predicted K-factor (from the simulation), is also used to by feedback control to determine whether drives need to be turned to raise, lower, or off, depending on a comparison with a K-factor target as follows.

If the predicted K-factor is greater than the target by greater than 0.005 units, the anode is lowered until the difference is less than 0.002. If the predicted K-factor is lower than the target by less than −0.005 units, the anode is raised until the difference is greater than −0.002. This control rule results in minimum drive on-off cycles of approximately 0.2 seconds, and this is sufficiently long to assure that actual drive movement occurs.

The constants of the mirroring controller were adjusted so that the average difference between real and simulated K-factors decreased to zero over a 15 second time interval, following a disturbance.

Performance of this system was stable and controlled all 12 anodes simultaneously over a one year period of time. During this control period, adjustments were made on average about one an hour, proving that unwanted adjustments had been eliminated. Also, excellent protection of all anodes was achieved because the system remained responsive to slow drifts in operating conditions, making adjustments whenever necessary.

EXAMPLE 4

Model Predictive Control of Calcium Carbonate Precipitator

Figure 11:
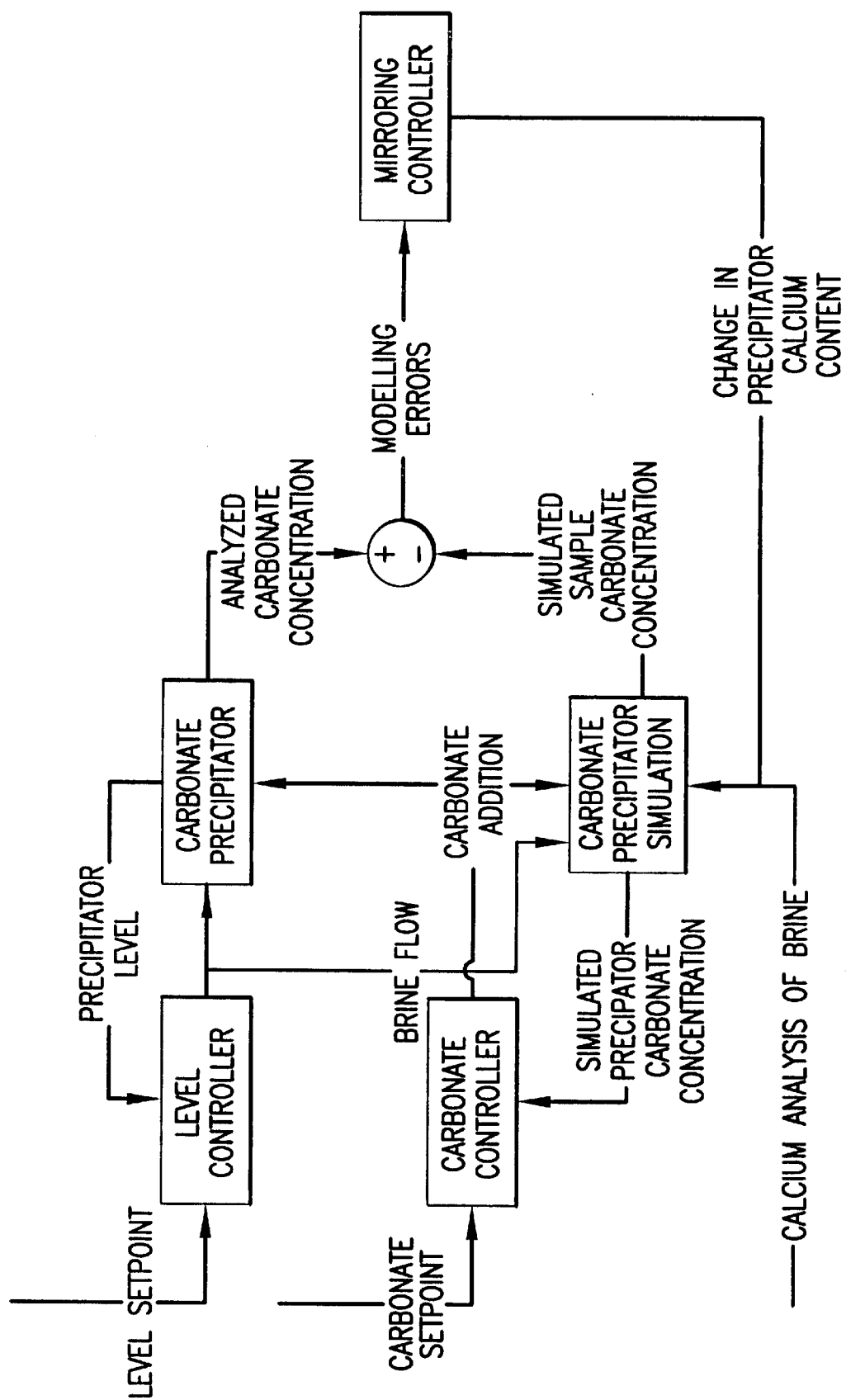
FIG. 11 is a flow chart of a preferred embodiment of the present invention wherein the carbonate concentration in a carbonate precipitator is used to control the performance of the precipitator.

The model-predictive control methods of this invention are also useful when applied to processes that require feedback control of a parameter that is not measurable on-line. In general, off-line measurements can be used to update simulation parameters sporadically, rather than continuously, whereas the feedback control signals originating from the simulation are recomputed on each scan cycle of the controller. This example also illustrates the combination of conventional feedback control and automatic control, as indicated in FIG. 11.

The calcium carbonate precipitation process is a stirred tank into which brine (containing calcium) and a solution of sodium carbonate is fed. The process control objective is to maintain a constant level of excess carbonate ion, and to maintain constant level of brine in the tank, as brine is continuously removed for filtering downstream. The level of calcium in the incoming brine changes very little over time, but the flow rate of brine out of the precipitator varies widely. Conventional feedback control is used to maintain a constant level in the tank by increasing brine flow into the tank as the level falls below set point, and decreasing brine flow to zero as the level of the tank approaches full.

The difficulty in control of this process is that excess carbonate is measured off line from samples taken to the laboratory periodically. This analysis may take from 30 minutes to an hour to be made available. Tight control desired, because there is an optimum carbonate concentration at which calcium solubility in the brine and filterability of the precipitate is optimized. Because there is a long lag time in the analysis, and because analysis is not always performed on a regular basis, controllability of this process is poor with conventional methods.

In the application of this invention to the precipitator, a real-time dynamic model of the precipitator performs a dynamic mass balance of material entering and leaving the tank. The result of this mass balance includes an estimate of the present excess carbonate content of the brine. Reaction of calcium with carbonate is not instantaneous, but for the purposes of control, the model need not take reaction time into account. In order to correct the simulation for discrepancies with laboratory analysis, the analytical result of a sample is compared with a stored value of the simulated carbonate concentration, saved at the time the sample was taken. On the basis of the comparison, the simulation is corrected as soon as the analysis is available by adding or subtracting calcium (or carbonate) from the simulated precipitator in order to make a step adjustment that will correct the discrepancy. This correction will change the current simulated carbonate value such that if it were extrapolated back in time to when the sample was taken, it would match the analytical result. If this change shows that more or less carbonate is needed in the tank, the feedback control will increase or decrease the amount of carbonate added to bring the whole tank to the desired level, then return to a rate of carbonate addition required to hold the level at a steady value.

Because the simulation takes into account changes in brine flow rate into the tank, the feedback control of carbonate addition is responsive to changes in calcium load on the tank, as well as to carbonate leaving the tank with the product.

While the invention has been described above with reference to specific embodiments thereof, it is apparent that many changes, modifications, and variations can be made without departing from the inventive concept disclosed herein. Accordingly, it is intended to embrace all such changes, modifications, and variations that fall within the spirit and broad scope of the appended claims. A patent applications, patents, and other publications cited herein are incorporated by reference in their entirety.

What is claimed is:

1. An automatic control system for an anode adjuster system for a chlor/alkali cell comprising:
   (a) a real anode adjuster system for a chlor/alkali cell wherein at least one process parameter is measured in real-time intervals and an output signal corresponding to each measured process parameter is obtained;
   (b) a real-time dynamic simulator of the anode adjuster system of the chlor/alkali cell, wherein said same variable process parameter or parameters are estimated in real-time intervals and an output signal corresponding to each estimated process parameter or parameters are obtained;
   (c) a calculator for receiving the output signals from (a) and (b) and providing a calculated output signal that corresponds to the difference of those corresponding output signals from (a) and (b) for each process parameter;
   (d) a mirroring controller capable of receiving the calculated output signal from the calculator and converting that calculated output signal into a change signal that is sent to the real-time dynamic simulator, whereby the estimated process parameter or parameters are updated and an updated estimated output signal is obtained in the real-time dynamic simulator; and
   (e) a feed-back control unit that capable of receiving a feed-back signal from the real-time dynamic simulator and converting that feed-back signal into one or more control output signal to both the real anode adjuster system for a chlor/alkali cell and the real-time dynamic simulator, each control output signal capable of causing an adjustment in the measured variable process parameter of that real anode adjuster system for the chlor/alkali cell and estimated process parameter in the real-time dynamic simulator.

2. The system of claim 1 wherein the real system for the chlor/alkali cell additionally provides an output signal to the feed-back control unit that corresponds to at least one measured variable process parameter and the feed-back control system uses that output signal to provide the control output signals to the real system for the chlor/alkali cell and real-time dynamic simulator.

3. An automatic control system for a distillation column comprising:
   (a) a real distillation column wherein an average middle temperature (AMT) of the distillation column is measured in real-time intervals and an output signal corresponding to the measured AMT is obtained;
   (b) a real-time dynamic simulator of the distillation column, wherein a corresponding AMT is estimated in real-time intervals and an output signal corresponding to the estimated AMT is obtained;
   (c) a calculator for receiving the measured AMT output signal and the estimated AMT output signal and calculating their difference and then providing a calculated AMT output signal that corresponds to that difference;
   (d) mirroring controller that is capable of receiving the calculated AMT output signal from the calculator and generating a change signal to the real-time dynamic simulator, whereby the estimated AMT is updated in the real-time dynamic simulator which then generates both an updated estimated AMT to the calculator and a feed-back output signal that corresponds to the updated estimated AMT of the distillation column; and
   (e) feed-back control unit that is capable of receiving the feed-back output signal from the real-time dynamic simulator and then generating control output signals to both the real distillation and the real-time dynamic column simulator, said control output signals capable of adjusting the AMT in the distillation column and in the real-time dynamic simulator.

4. The system of claim 3 wherein the real distillation column additionally provides a measured feed-back parameter output signal to the feed-back control unit that corresponds to the AMT and the feed-back control unit uses that output signal to provide the control output signals to the real distillation column and real-time dynamic simulator.

5. An automatic control system for anode adjustment in a chlor/alkali cell comprising:
   (a) at least one anode for a chlor/alkali cell;
   (b) means for measuring the current and the voltage for that anode;
   (c) anode adjuster for raising or lowering that anode to change the distance between that anode and the cathode of the chlor/alkali cell;

(d) means for measuring the K-factor for that anode in real-time intervals and means for generating an output signal corresponding to that measured K-factor;

(e) a real-time dynamic simulator of that anode and that anode adjuster where the K-factor is estimated in real-time intervals and an output signal corresponding to the estimated K-factor is obtained;

(f) a calculator for receiving the measured K-factor signal and the estimated K-factor signal and calculating their difference and converting that difference into a calculated K-factor error output signal;

(g) a mirroring controller capable of receiving that calculated K-factor error signal and converting it into a change signal that is sent to the real-time dynamic simulator which then generates both an updated estimated K-factor output signal to the calculator and an estimated anode position feed-back output signal; and (h) a feed-back controller that is capable of receiving that estimated anode position feed-back output signal from the real-time dynamic generator and then generating control output signals to both the anode adjuster and the real-time dynamic simulator, said control output signals capable of raising or lowering the anode adjuster in the chlor/alkali and capable of adjusting the simulated anode adjuster in the real-time dynamic simulator.

6. The process for controlling at least one average middle temperature in a distillation column comprising the steps of:

(1) generating at least one measured output signal in real-time intervals for a real distillation column, said output signal or signals corresponding to a measured average middle temperature of the distillation column;

(2) generating at least one estimated output signal in real-time intervals from a real-time dynamic simulator, said estimated output signal or signals corresponding to an estimated average middle temperature of the real-time dynamic simulator;

(3) comparing each corresponding measured output signal and estimated output signal and calculating the difference between those signals;

(4) converting this calculated output signal into a change signal;

(5) generating an updated estimated output signal in the real-time dynamic simulator based on this change signal and sending this updated estimated output signal to step (3);

(6) generating a feed-back output signal in the real-time dynamic simulator based on the change signal, wherein the feed-back signal corresponding to the updated estimated average middle temperature in said distillation column, and (7) converting that feed-back signal in to a control signal to the distillation column to the real-time dynamic simulator, wherein the average middle temperature distillation column and the estimate average middle temperature in the real-time dynamic simulator are both adjusted.

7. The process for controlling at least one variable parameter of an anode adjuster system of a chlor/alkali cell comprising the steps of:

(1) generating at least one measured output signal in real-time intervals for an anode adjuster system of a chlor/alkali cell, said output signal or signals corresponding to a measured variable process parameter or parameters of the anode adjuster system of the chlor/alkali cell;

(2) generating at least one estimated output signal in real-time intervals from a real-time dynamic simulator; said estimated output signal or signals corresponding to an estimated variable process parameter or parameters of the real-time dynamic simulator;

(3) comparing each corresponding measured output signal and estimated output signal and calculating the difference between those signals;

(4) converting this calculated output signal into a change signal;

(5) generating an updated estimated output signal in the real-time dynamic simulator based on this change signal and sending this updated estimated output signal to step (3);

(6) generating a feed-back output signal in the real-time dynamic simulator based on the change signal, wherein the feed-back signal corresponding to the updated estimated variable parameter in said anode adjuster system for the chlor/alkali cell; and (7) converting that feed-back signal into a control signal to the anode adjuster system for the chlor/alkali cell and to the real-time dynamic simulator, wherein the variable parameter of the anode adjuster system for the chlor/alkali cell and the estimated process parameter in the real-time dynamic simulator are both adjusted.

\* \* \* \* \*